(12) United States Patent
Akin et al.

(10) Patent No.: US 12,393,421 B2
(45) Date of Patent: *Aug. 19, 2025

(54) TECHNIQUES FOR DECOUPLED ACCESS-EXECUTE NEAR-MEMORY PROCESSING

(71) Applicant: Intel Corporation, Santa Clara, CA (US)

(72) Inventors: Berkin Akin, Hillsboro, OR (US); Alaa R. Alameldeen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,797

(22) Filed: Nov. 10, 2023

(65) Prior Publication Data

US 2024/0078112 A1 Mar. 7, 2024

Related U.S. Application Data

(63) Continuation of application No. 16/585,521, filed on Sep. 27, 2019, now Pat. No. 11,853,758.

(51) Int. Cl.
*G06F 9/30* (2018.01)
(52) U.S. Cl.
CPC ........ *G06F 9/3004* (2013.01); *G06F 9/30087* (2013.01)
(58) Field of Classification Search
None
See application file for complete search history.

(56) References Cited

U.S. PATENT DOCUMENTS

| | | | |
|---|---|---|---|
| 6,145,073 A | 11/2000 | Cismas | |
| 6,691,206 B1* | 2/2004 | Rubinstein | H04N 19/61 711/E12.013 |
| 6,728,873 B1 | 4/2004 | Guthrie et al. | |
| 7,334,110 B1 | 2/2008 | Faanes et al. | |
| 7,437,521 B1* | 10/2008 | Scott | G06F 9/30038 711/158 |
| 8,458,443 B2* | 6/2013 | Tramm | G06F 9/3871 712/214 |
| 9,678,673 B2 | 6/2017 | Voigt | |
| 2002/0099910 A1* | 7/2002 | Shah | G06F 9/3867 712/E9.047 |
| 2013/0305022 A1 | 11/2013 | Eisen et al. | |
| 2015/0012717 A1* | 1/2015 | Murphy | G06T 1/60 711/167 |
| 2015/0149718 A1 | 5/2015 | Nakamura et al. | |
| 2016/0041906 A1 | 2/2016 | Mukherjee et al. | |

(Continued)

OTHER PUBLICATIONS

European Office Action for Patent Application No. 20181133.8, Mailed Dec. 9, 2021, 7 pages.

(Continued)

*Primary Examiner* — Eric Coleman
(74) *Attorney, Agent, or Firm* — Compass IP Law PC

(57) ABSTRACT

Techniques for decoupled access-execute near-memory processing include examples of first or second circuitry of a near-memory processor receiving instructions that cause the first circuitry to implement system memory access operations to access one or more data chunks and the second circuitry to implement compute operations using the one or more data chunks.

20 Claims, 11 Drawing Sheets

(56) References Cited

U.S. PATENT DOCUMENTS

2016/0179717 A1* 6/2016 Davis ............... G06F 13/28
                                                   710/308
2017/0293587 A1* 10/2017 Yan ................ G06F 13/4045
2020/0103932 A1* 4/2020 Sanghi ............... G06F 1/324

OTHER PUBLICATIONS

European Second Office Action for Patent Application No. 20181133.8, Mailed Apr. 5, 2023, 8 pages.
Extended European Search Report for Patent Application No. 20181133.8, Mailed Mar. 12, 2021, 11 pages.
Final Office Action for U.S. Appl. No. 16/585,521, Mailed May 18, 2021, 15 pages.
Office Action for U.S. Appl. No. 16/585,521, Mailed Jan. 1, 2021, 14 pages.
Won W Ro et al., "Design and evaluation of a hierarchical decoupled architecture", The Journal of Supercomputing, Kluwer Academic Publishers, BO, vol. 38, No. 3, Dec. 2, 2006, pp. 237-259.
European Third Office Action for Patent Application No. 20181133.8, Mailed Nov. 8, 2024, 4 pages.

\* cited by examiner

600

RECEIVE, AT FIRST CIRCUITRY OF A NEAR-MEMORY PROCESSOR, DATA ACCESS INSTRUCTIONS TO ACCESS A SYSTEM MEMORY, THE DATA ACCESS INSTRUCTIONS HAVING CORRESPONDING COMPUTE INSTRUCTIONS RECEIVED BY A SECOND CIRCUITRY OF THE NEAR-MEMORY PROCESSOR
602

EXCHANGE SYNCHRONIZATION INFORMATION WITH THE SECOND CIRCUITRY TO STORE ONE OR MORE DATA CHUNKS FROM THE ACCESSED SYSTEM MEMORY TO A LOCAL MEMORY AT THE NEAR-MEMORY PROCESSOR FOR THE SECOND CIRCUITRY TO USE FOR ONE OR MORE COMPUTE ITERATIONS
604

MAP DATA ACCESS OPERATIONS FOR THE FIRST CIRCUITRY TO ACCESS THE SYSTEM MEMORY TO OBTAIN THE ONE OR MORE DATA CHUNKS BASED ON THE DATA ACCESS INSTRUCTIONS AND THE EXCHANGED SYNCHRONIZATION INFORMATION
606

ACCESS THE SYSTEM MEMORY TO OBTAIN THE ONE OR MORE DATA CHUNKS VIA ONE OR MEMORY CHANNELS COUPLED WITH THE NEAR-MEMORY PROCESSOR BASED ON THE MAPPED DATA ACCESS OPERATIONS
608

STORE THE ONE OR MORE DATA CHUNKS TO THE LOCAL MEMORY BASED ON THE MAPPED DATA ACCESS OPERATIONS
610

FIG. 6

Storage Medium 700

*Computer Executable Instructions for 600*

RECEIVE, AT FIRST CIRCUITRY OF A NEAR-MEMORY PROCESSOR, COMPUTE INSTRUCTIONS TO USE ONE OR MORE DATA CHUNKS ACCESSED FROM A SYSTEM MEMORY IN ONE OR MORE COMPUTE ITERATIONS, THE ONE OR MORE DATA CHUNKS ACCESSED AND STORED TO A LOCAL MEMORY AT THE NEAR-MEMORY PROCESSOR BY A SECOND CIRCUITRY OF THE NEAR-MEMORY PROCESSOR BASED ON CORRESPONDING DATA ACCESS INSTRUCTIONS
902

EXCHANGE SYNCHRONIZATION INFORMATION WITH THE SECOND CIRCUITRY TO ACCESS THE ONE OR MORE DATA CHUNKS STORED TO THE LOCAL MEMORY FOR USE IN THE ONE OR MORE COMPUTE ITERATIONS
904

MAP COMPUTE OPERATIONS FOR THE FIRST CIRCUITRY TO USE THE ONE OR MORE DATA CHUNKS BASED ON THE RECEIVED COMPUTE INSTRUCTIONS AND THE EXCHANGED SYNCHRONIZATION INFORMATION
906

ACCESS THE LOCAL MEMORY TO OBTAIN THE ONE OR MORE DATA CHUNKS BASED ON THE MAPPED COMPUTE OPERATIONS
908

STORE RESULTS OF THE ONE OR MORE COMPUTE ITERATIONS TO THE LOCAL MEMORY BASED ON THE EXCHANGED SYNCHRONIZATION INFORMATION
910

*FIG. 9*

Storage Medium 1000

*Computer Executable Instructions for 900*

FIG. 10

TECHNIQUES FOR DECOUPLED ACCESS-EXECUTE NEAR-MEMORY PROCESSING

CROSS-REFERENCE TO RELATED APPLICATIONS

This application is a continuation of U.S. patent application Ser. No. 16/585,521, filed Sep. 27, 2019. The entire specification of which is hereby incorporated herein by reference in its entirety.

TECHNICAL FIELD

Descriptions are generally related to techniques associated with an architecture for decoupled access-execute near-memory processing.

BACKGROUND

Advancements in an ability of processors to process data have recently become unmatched by corresponding advancements in memory access technologies in terms of latency and energy consumption favoring processors. Attempts to address these latency and energy consumption discrepancies from the memory side may include use of types of processing architectures such as near-memory processing (NMP) or processing-in-memory (PIM) architectures. NMP architectures may be configured to allow for higher data bandwidth access on a memory side of a processor or CPU while side-stepping roundtrip data movements between the processor or CPU and main or system memory. Side-stepping roundtrip data movements may enable an acceleration of bandwidth-bound, data-parallel, and high bytes/operation ratio computations. In some NMP architectures, simple processing elements may be situated on the memory side. For example, many small general-purpose cores, specialized fixed-function accelerators, or even graphic processing units (GPUs).

BRIEF DESCRIPTION OF THE DRAWINGS

FIG. 6 illustrates an example first logic flow.
FIG. 7 illustrates an example first storage medium.
FIG. 9 illustrates an example second logic flow.
FIG. 10 illustrates an example second storage medium.

DETAILED DESCRIPTION

NMP architectures implemented to accelerate bandwidth-bound, data-parallel, and high bytes/operation ratio computations may have limited die area, power budget, and/or logic complexity for processing units on a memory side of a processor. As a result of these limitations, general-purpose, programmable NMP architectures may not fully utilize high levels of memory bandwidth potentially available inside a memory. Although domain-specific accelerators may be a way to efficiently utilize these limited resources related to die area, power budgets, and/or logic complexity, domain-specific accelerators may only execute a limited set of workloads.

Prior examples of NMP architectures attempted to extract greater memory bandwidth utilization via use of von-Neumann style, many-core processors in environments that include a limited die area, a limited power budget, and/or logic complexity. The use of von-Neumann style, many-core processors included each core being responsible for both (i) discovering a program or application flow and issuing memory requests (e.g., accesses) and (ii) actually preforming computations on accessed data (e.g., execute). However, these types of NMP architectures typically do not reduce memory access latencies significantly. Hence, von-Neumann style, many-core processors on a memory side may become limited in extracting an acceptable memory level parallelism due to relatively long latency load/stores of data interleaved with computations made using the accessed data. Also, these types of NMP architectures may be overprovisioned to perform both of these fundamental access/execute tasks. Single instruction, multiple data (SIMD) execution that may utilize data-parallel features as a path towards more efficiency where multiple "execute" actions are bundled for each "access" action may be a possible solution. Examples described in this disclosure may build on SIMD execution concepts and may include decoupling access and execute tasks on separate specialized cores to achieve improved die area and power efficiency for NMP by minimizing overprovisioning on each specialized core without completely sacrificing programmability.

Figure 1:
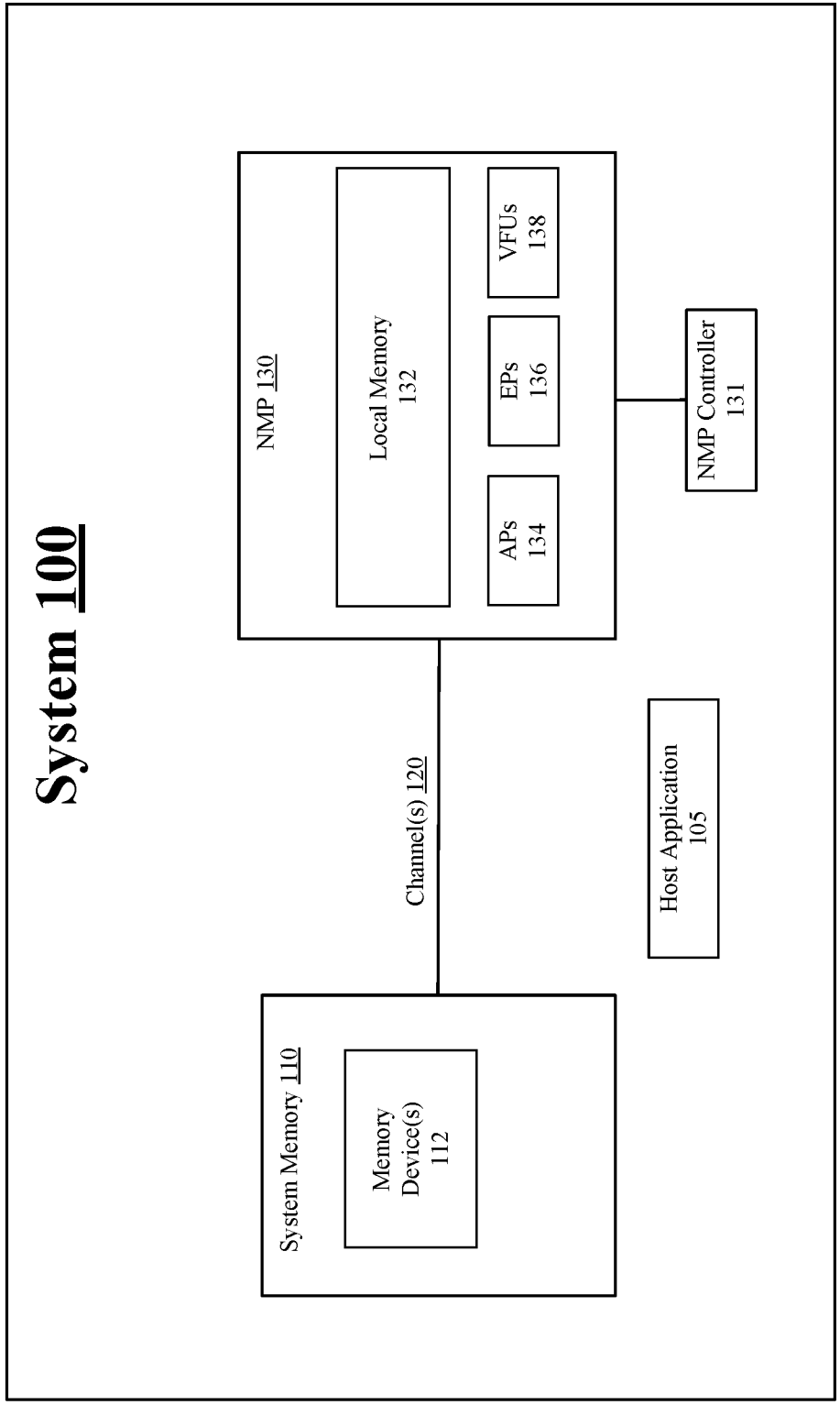
FIG. 1 illustrates an example system.

FIG. 1 illustrates an example system 100. In some examples, as shown in FIG. 1, system 100 includes a host application 105, a system memory 110 and a near-memory processor (NMP) 130 coupled to system memory via one or more channel(s) 120. Also, as shown in FIG. 1, an NMP controller 131 may couple with NMP 130 and be located outside of NMP 130 (e.g., on a separate die). Although, in other examples, NMP controller 131 may be present inside of NMP 130 (e.g., on a same die).

According to some examples, as shown in FIG. 1, NMP 130 may include a local memory 132, access processors (APs) 134, execute processors (EPs) 136 and vector functional units (VFUs) 138. As described more below, APs 134 and EPs 136 may represent different types of functional cores to implement certain instruction set architecture (ISA) and micro-architecture features. For example, APs 134 may specialize on data movement between system memory 110 and local memory 132 and may be more aggressive to discover and issue memory requests compared to a conventional, many-core, non-specialized style NMP. Also, EPs 136 coupled with VFUs 138 may perform computations without executing load/store instructions or memory address translations. These specializations for APs, EPs or VFUs may minimize resource overprovisioning for each core type. Minimizing resource overprovisioning may lead to improved memory bandwidth utilization and greater latency tolerance when an NMP such as NMP 130 operates with a limited die area and/or power budget.

In some examples, as described more below, APs 134, EPs 136 and VFUs 138 may be part of a type of decoupled access-execute architecture for near memory processing (DAE-NMP). A main motivation behind this type of DAE-NMP architecture is to be able to utilize possibly high levels of internal bandwidth available within NMP 130 (e.g., between local memory 132 and APs 134 or VFUs 138) compared to bandwidth available via channel(s) 120 coupled with system memory 110 by using limited area/power/ complexity resources to implement programmable NMP units that include cores such as APs 134, EPs 136 or VFUs 138. Although this disclosure may highlight or describe primarily general-purpose, programmable NMP units, examples may be extended to include domain-specific hardware accelerators (e.g., neural processing units, matrix/tensor engines, graphic processing units, etc.).

According to some examples, host application 105 may represent, but is not limited to, types of applications or software hosted by a computing platform (e.g., a server) that may route instructions to NMP controller 131. For example, a PageRank application, a sparse matrix-vector multiplication (SpMV) application, a stream application or a stencil application. In some examples, NMP controller 131 may bifurcate instructions received from host application 105 into separate data access and compute instructions to be implemented or controlled by one or more APs 134, EPs 136 or VFUs 138 included in NMP 130. As described more below, synchronization between one or more APs 134 and one or more EPs 136 facilitate execution of the bifurcated instructions to generate results that are then made accessible or provided to host application 105. In some examples, NMP controller 131 may serve as a type of compiler to translate instructions received from host application 105 so those instructions may be implemented in a DAE-NMP architecture included in NMP 130 to produce timely results using limited area/power/complexity resources.

In some examples, memory device(s) 112 included in system memory 110 or local memory 132 included in NMP 130 may include non-volatile and/or volatile types of memory. Volatile types of memory may include, but are not limited to, random-access memory (RAM), Dynamic RAM (DRAM), double data rate synchronous dynamic RAM (DDR SDRAM), static random-access memory (SRAM), thyristor RAM (T-RAM) or zero-capacitor RAM (Z-RAM). Non-volatile types of memory may include byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

According to some examples, system memory 110 may be configured as a two level memory (2LM) in which system memory 110 may serve as main memory for a computing device or platform that includes system 100. For these examples, memory device(s) 112 may include the two levels of memory including cached subsets of system disk level storage. In this configuration, the main memory may include "near memory" arranged to include volatile types of memory and "far memory" arranged to include volatile or non-volatile types of memory. The far memory may include volatile or non-volatile memory that may be larger and possibly slower than the volatile memory included in the near memory. The far memory may be presented as "main memory" to an operating system (OS) for the computing device while the near memory is a cache for the far memory that is transparent to the OS. Near memory may be coupled to NMP 130 via high bandwidth, low latency means for efficient processing that may include use of one or more memory channels included in channel(s) 120. Far memory may be coupled to NMP 130 via relatively low bandwidth, high latency means that may include use of one or more other memory channels included in channel(s) 120.

Figure 2:
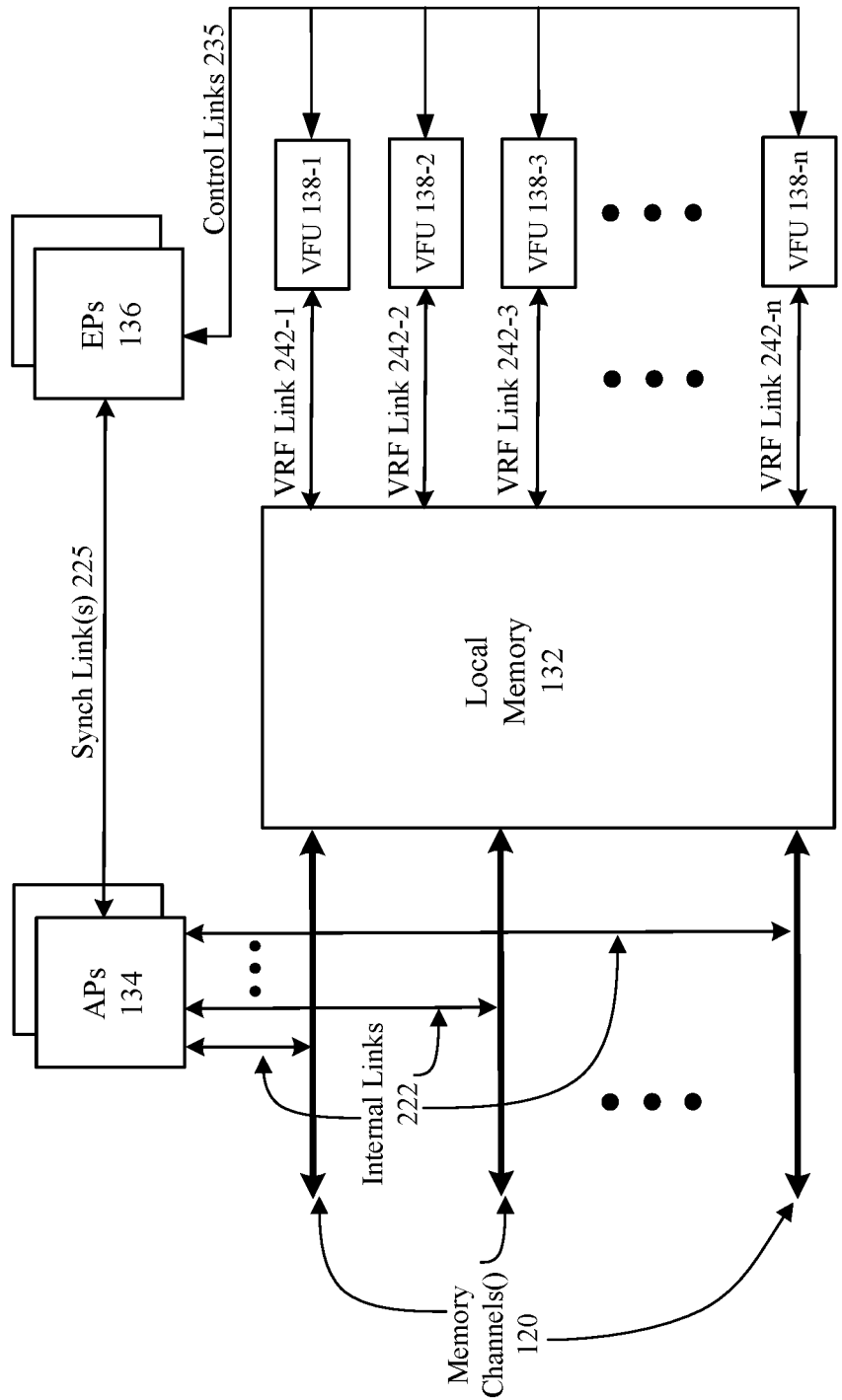
FIG. 2 illustrates an example centralized near-memory processor.

FIG. 2 illustrates an example centralized NMP 200. In some examples, centralized NMP 200 may depict a type of centralized DAE-NMP organization or architecture that is centered around local memory 132. For these examples, as shown in FIG. 2, APs 134 may couple with memory channel(s) 120 via internal links 222. Internal links 222, for example, may include a through-silicon via (TSV) bus, vaults or sub-arrays that may be based on the type of memory technology implemented in the system memory coupled with memory channel(s) 120 and/or included in local memory 132. Also, as part of centralized NMP 200, synch link(s) 225 may represent one or more dedicated connections between APs 134 and EPs 136 to facilitate exchanging of one or more synchronization primitives to support process synchronization for separately implementing access and compute operations. Also, as part of centralized NMP 200, control links 235 may enable EPs 136 to send out control messages to VFUs 138-1 to 138-n, where "n" represents any positive, whole integer >3. The control messages may control a flow of compute iterations associated with compute instructions received by EPs 136. Also, as part of centralized NMP 200, VRF links 242-1 to 242-n coupled between local memory 132 and respective VFUs 138-1 to 138-n may represent separate vector register files (VRFs) to directly attached these VFUs to at least portions of local memory 132.

According to some examples, APs 134 may include logic and/or features to implement instructions related to data movement or memory address calculations. The logic and/or features of APs 134 may implement a rich set of data movement instructions that may include, but is not limited to, load/store operations, gather/scatter operations, indirection operations, shuffle operations, or permutation operations. However, instructions including, but not limited to, floating point data type operations, advanced compute/vector operations (e.g., power, exponentiation, root, logarithm, dot product, multiply-accumulate, etc.) are not supported by the logic and/or features of APs 134. Note that the logic and/or features included in APs 134 may still implement a subset of integer arithmetic operations associated with, for example, memory address calculations. For an example DAE-NMP architecture presented by centralized NMP 200, that may have a limited die area or power budget, APs 134 may provide a way to dedicate more resources to create an enhanced data movement micro-architecture that does not include complex compute operations. This may reduce resource overprovisioning compared to a generic/non-specialized cores and result in better die area utilization and/or energy efficiencies.

In some examples, APs 134 may also include logic and/or features to implement or perform address translation and memory management. For example, with a virtual memory system typically required for general purpose computing, accessing system memory may require permission, ownership, boundary checks as well as virtual-to-physical address translations. These types of functionalities may be supported by the logic and/or features of APs 134. According to some examples, the logic and/or features included in APs 134 may incorporate a memory management unit (MMU) and instruction & data-translation lookaside buffer (I&D-TLB) hierarchies that may be similar to those implemented by conventional, general purpose CPUs or processors.

According to some examples, EPs 136 may include logic and/or features to orchestrate or control compute operations. For example, the logic and/or features of EPs 136 may control advanced vector compute instructions and operations (e.g., executed by VFUs 138-1 to 138-*n*) on floating-point data types. As part of this control, logic and/or features of EPs 136 may handle/control fetch instructions, decode instructions, control-flow resolution instructions, dependence-check instructions and retirement of these instructions. For these examples, actual computations associated with these types of compute instructions may be performed by one or more VFUs 138-1 to 138-*n*. For example, logic and/or features of EPs 136, based on control flow of an execute instruction or program, may send out control messages to one or more VFUs included in VFUs 138-1 to 138-*n* via control links 235. VFUs 138-1 to 138-*n* may be arranged as SIMD arithmetic logic units (ALUs) that couple to local memory 132 via respective VRF links 242-1 to 242-*m*.

In some examples, functionally, for execution of an execute instruction or program, a collection of one or more EPs 136 and one or more VFUs from among VFUs 138-1 to 138-*n* may be considered as a single computation unit. This single computation unit may represent an "execute" portion of the DAE-NMP type of architecture depicted by centralized NMP 200. According to some examples, multiple VFUs from among VFUs 138-1 to 138-*n* may share a single EP from among EPs 136 and may be able to exploit data-parallel execution. According to some examples, EPs 136 or VFUs 138-1 to 138-*n* may be responsible for accessing only local memory 132 and do not have any responsibilities for data accesses to/from system memory. As a result, EPs 136 or VFUs 138-1 to 138-*n* may not implement MMU or I&D TLB hierarchies since these types of functionalities are implemented by APs 134 to access system memory via memory channel(s) 120. Hence, EPs 136 and/or VFUs 138-1 to 138-*n* also reduce resource overprovisioning compared to a generic/non-specialized cores and also improve die area utilization and/or energy efficiencies.

According to some examples, local memory 132 may represent an on-chip memory hierarchy. For examples, where logic and/or features of APs 134 handle memory address translation and system memory access routines to place or temporarily store data obtained from system memory to local memory 132, local memory 132 may be implemented as a type of cache or scratch-pad memory that is part of an addressable memory space. Although depicted in FIG. 2 as a single block, local memory 132 may be arranged in a multi-level hierarchy.

In some examples, as briefly mentioned above, synch link(s) 225 may facilitate an exchanging of synchronization information that may include one or more synchronization primitives between APs 134 and EPs 136. For these examples, the synchronization primitives (e.g., barrier, fence, lock/unlock) may be part of an ISA for an DAE-NMP architecture such as centralized NMP 200. The synchronization primitives may provide a means of communication between APs 134 and EPs 136. For example, a long sequence of computations can be divided into chunks, where data access operations are mapped into APs 134 and compute operations are mapped into EPs 136/VFUs 138. These chunks may be executed in a pipeline-parallel fashion such that while one or more EPs 136/VFUs 138 are computing the current chunk, one or more APs 134 may bring in one or more subsequent chunks. In some examples where EP/VFU throughput is not matched by AP access bandwidth, APs 134 may go further ahead, e.g., access multiple data chucks prior to these data chunks being used in computations. If APs 134 goes further ahead, barrier synchronization primitives may be exchanged with EPs 136. This way, EPs 136/VFUs 138 finishing iteration i may enable APs 134 to start fetching data chunks for iteration i+p using exchanged barrier synchronization primitives, where p depends on a size of the compute throughput/memory access bandwidth imbalance between EP/VFUs and APs.

According to some examples, local memory 132 may be used for AP/EP synchronization. For these examples, producer/consumer type operations may enable a rate at which local memory 132 is filled/emptied to be used as a metric for synchronization. For this type of metric, read/write counters may be included in local memory 132 when local memory 132 is arranged in a scratch-pad configuration. When local memory 132 is arranged in a cache configuration valid/dirty/used counters may be included in local memory 132. Both of these types of counters may be utilized by logic and/or features of APs 134 or EP 136 to boost/throttle APs 134/EPs 136 in order to balance memory access bandwidth for APs 134 with compute throughput of EPs 136/VFUs 138.

Figure 3:
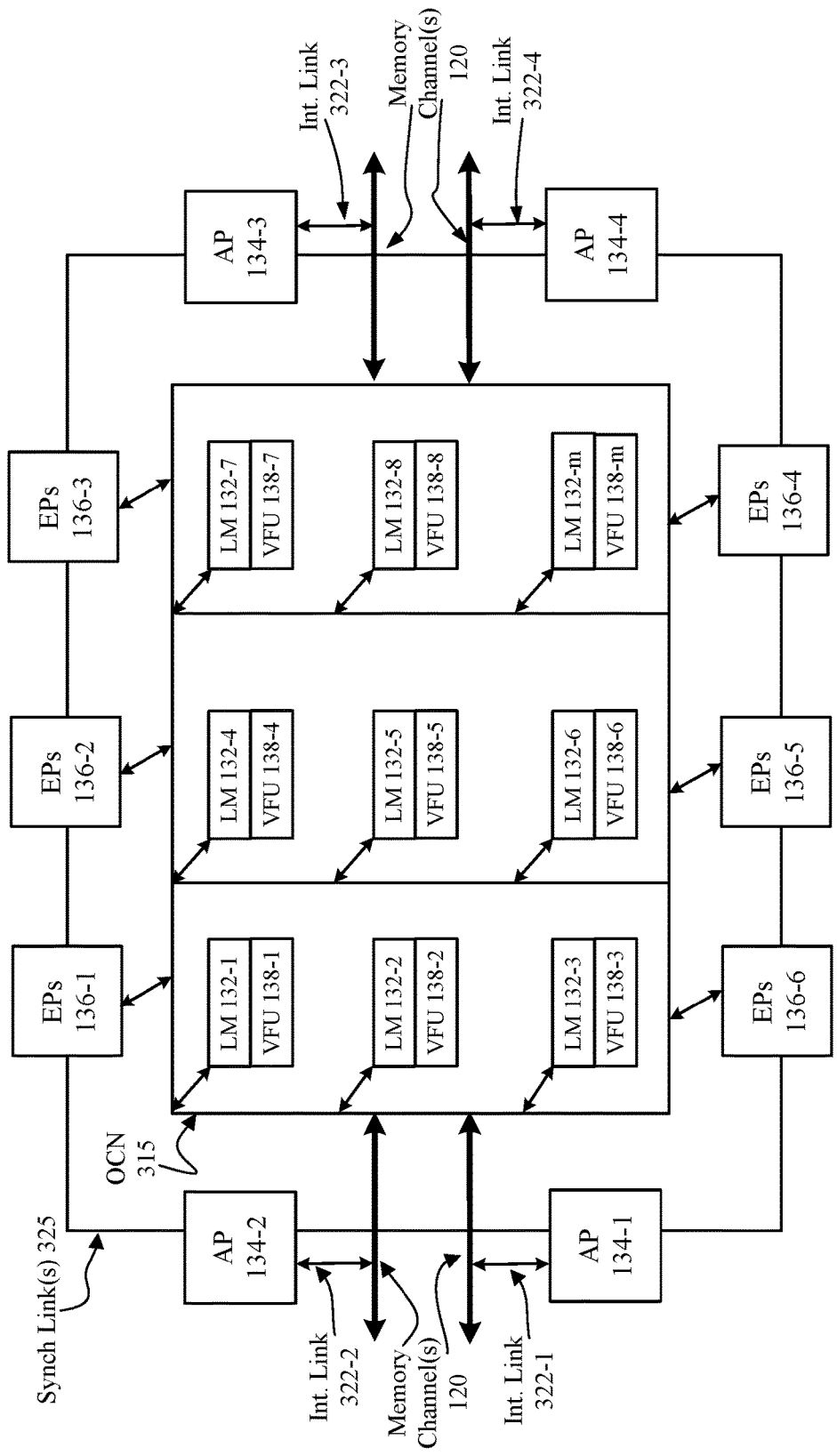
FIG. 3 illustrates an example distributed near-memory processor.

FIG. 3 illustrates an example distributed NMP 300. In some examples, distributed NMP 300 may depict a type of distributed DAE-NMP organization or architecture that distributes local memory 132 among separate VFUs 138. For these examples, as shown in FIG. 3, APs 134-1 to 134-4 may couple with memory channel(s) 120 via respective internal links 322-1 to 322-4. Examples are not limited to 4 APs and 4 respective internal links, any number of APs and respective internal links are contemplated for a distributed NMP. Similar to internal links 222 mentioned previously for centralized NMP 200, internal links 322-1 to 322-4 may include an TSV bus, vaults or sub-arrays that may be based on the type of memory technology implemented in the system memory coupled with memory channel(s) 120 and/or included in local memory 132. Also, as part of distributed NMP 300, synch link(s) 325 may represent one or more dedicated connections between APs 134-1 to 134-4 and EPs 136-1 to 136-6 (examples not limited to 6 EPs) to facilitate exchanging of synchronization information that may include one or more synchronization primitives to support process synchronization for separately implementing access and compute operations. Also, as part of distributed NMP 300, an on-chip network (OCN) 315 may represent an on-chip network via which EPs 136-1 to 136-4 may control VFUs 138-1 to 138-*m*, where "m" represents any positive, whole integer >8. Also, APs 134-1 to 134-4 may use respective internal links 322-1 to 322-4 to memory channel(s) 120 to route data to local memories 132-1 to 132-8 via OCN 315.

In some examples, an EP from among EPs 136-1 to 136-6 and one or more VFUs from among VFUs 138-1 to 138-*m* may be considered as a single computation unit. This single computation unit may represent an "execute" portion of the DAE-NMP type of architecture depicted by distributed NMP 300. According to some examples, multiple VFUs from among VFUs 138-1 to 138-*m* may share or be controlled by a single EP from among EPs 136-1 to 136-6 and may be able to exploit data-parallel execution.

According to some examples, distributed NMP 300 may be advantageous to centralized NMP 200 for operating scenarios where a compute throughput to available memory access bandwidth ratio is high for an NMP. For example, if the ratio of compute throughput to available memory bandwidth is 8, then eight VFUs might need to read at the same time from centralized local memory 132 which would saturate the centralized local memory's available bandwidth and degrade performance. For this example, a centralized local memory such as shown in FIG. 2 for centralized NMP 200's available bandwidth from local memory 132 may become a bottleneck and a distributed local memory such as shown in FIG. 3 for distributed NMP 300 may be preferred. A distributed NMP 300 would enable all eight VFUs to use the available bandwidth from an attached distributed local memory, so the total available local memory bandwidth from all local memories LM-132-1 to LM-132-n would provide enough access bandwidth to match the higher compute throughput. Hybrid chip organizations that combine centralized and distributed architectures on separate tiles of a multi-layered chip are contemplated. Thus, a multi-layered chip, in some examples, is not limited to a single type of NMP.

In some examples, APs 134 and EPs 136 included in distributed NMP 300 may include similar logic and/or features as mentioned above for APs 134 and EPs 136 included in centralized NMP 200. The primary difference between the two types of NMPs being the distribution of local memory 132 to individual VFUs 138 and use of an on-chip network to access local memory 132 and/or control VFUs 138.

Figure 4:
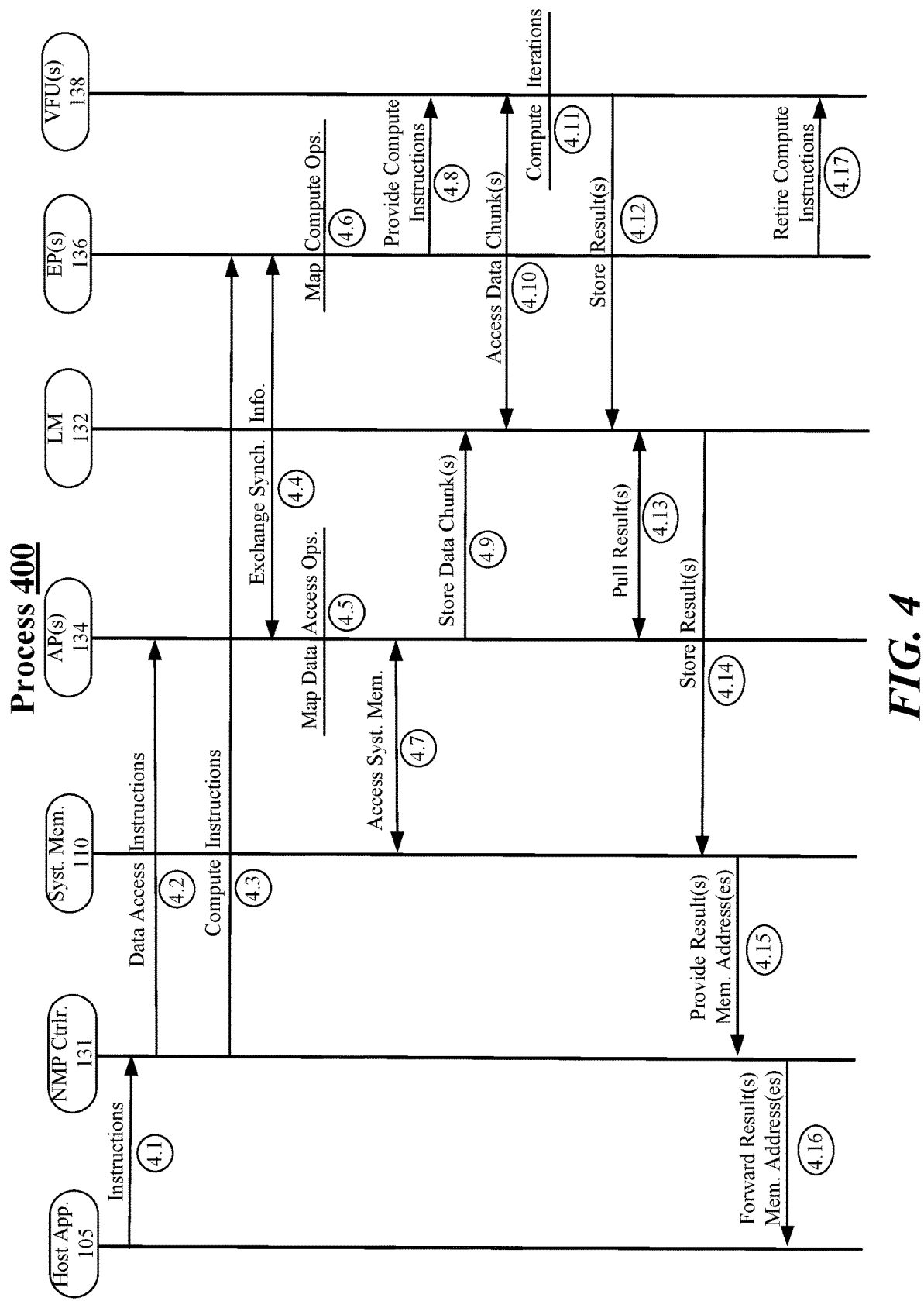
FIG. 4 illustrates an example process.

FIG. 4 illustrates an example process 400. In some examples, process 400 may depict how instructions received from an application are implemented by an NMP. For these examples, process 400 may include use of various elements shown in FIG. 1-3 such system memory 110, host application 105 and NMP controller 131 shown in FIG. 1 or AP(s) 134, EP(s) 136 and VFU(s) 138 shown FIGS. 1-3. Examples are not limited to these elements shown in FIGS. 1-3.

Beginning at process 4.1 (Instructions.), a host application 105 may route instructions to NMP controller 131. In some examples, host application 105 may be a type of application that has compute and memory access operations that are fine grain interleaved. In other words, types of iterative computing via which data is to be repeatedly accessed from system memory to complete each iteration of computing. For example, PageRank, SpMV, stream or stencil applications. For these types of applications, a balance between computing throughput and memory access bandwidth is advantageous to generating results based on instructions received from these types of applications.

Moving to process 4.2 (Data Access Instructions), logic and/or features of one or more AP(s) 134 may receive data access instructions from NMP controller 131. According to some examples, NMP controller 131 may separate out data access instructions from the instructions received from host application 105. In other examples, NMP controller 131 may just forward the instructions received from host application 105 and the logic and/or features of AP(s) 134 may be capable of identifying or separating out the data access instructions.

Moving to process 4.3 (Compute Instructions), logic and/or features of one or more EP(s) 136 may receive compute instructions from NMP controller 131. According to some examples, NMP controller 131 may separate out compute instructions from the instructions received from host application 105. In other examples, NMP controller 131 may just forward the instructions received from host application 105 and the logic and/or features of EP(s) 136 may be capable of identifying or separating out the compute instructions.

Moving to process 4.4 (Exchange Synch. Info.), logic and/or features of one or more AP(s) 134 and one or more EP(s) 136 may exchange synchronization information that may include synchronization primitives or instructions. In some examples, the exchanged synchronization information may include barrier synchronization primitives. For these examples, compute throughput for EP(s) 136/VFUs 138 for a single compute iteration on an accessed data chunk may be higher than memory access bandwidth for AP(s) 134 to access system memory 110 to obtain subsequent data chunks via memory channel(s) 120. In other words, one or more EP(s) 136/VFUs 138 will have to wait for subsequent data chunks to be obtained before moving to a next compute iteration. In order to address this imbalance, barrier synchronization primitives may be exchanged. The barrier instructions may indicate how many subsequent data chunks need to be accessed in order to keep EP(s) 136/VFUs 138 wait times to as low as level as possible. For example, AP 134 may start fetching data chunks for iteration i+p following the providing of a data chunk used by EP(s) 136/VFUs 138 for a first compute iteration i. If EP(s) 136/VFUs 138 have a compute access bandwidth that is twice as fast as AP(s) 134 memory access bandwidth, then p would need to have a value of at least 1 to be able balance compute throughput with memory access bandwidth.

Moving to process 4.5 (Map Data Access Ops.), logic and/or features of AP(s) 134, based on the exchanged synchronization primitives or instructions and the data access instructions, maps data access operations. According to some examples, mapped data access operations may instruct the logic and/or features of AP(s) 134 how and/or where to pull data chunks from system memory 110 via memory channel(s) 120 and where to place the data chunks in local memory 132.

Moving to process 4.6 (Map Compute Ops.), logic and/or features of EP(s) 136, based on the exchanged synchronization primitives or instructions and the compute instructions, maps compute operations. In some examples, mapped compute operations may instruct the logic and/or features of EP(s) 136 on how to control or instruct VFUs 138 on when and how to access data chunks from local memory 132 for computing each iteration to generate one or more results to eventually be forwarded to host application 105.

Moving to process 4.7 (Access Syst. Mem.), logic and/or features of AP(s) 134 may access system memory 110. In some examples, AP(s) 134 may separately include a private memory cache to at least temporarily store data chunks obtained from system memory 110 during these accesses to system memory 110. The private memory cache may be similar to a non-shared cache utilized by cores of conventional processors. For these examples, the data chunks may be accessed and at least temporarily stored by the logic and/or features of AP(s) 134 to respective private caches based on the mapping of data access operations mentioned above for process 4.5.

Moving to process 4.8 (Provide Compute Instructions), logic and/or features of EP(s) 136 provide compute instructions to one or more VFU(s) 138. According to some examples, the compute instructions may be based on the mapping of compute operations that instruct the logic and/or features of EP(s) 136 as mentioned above for process 4.6.

Moving to process 4.9 (Store Data Chunk(s)), logic and/or features of AP(s) 132 may store or place data chunks in local memory 132. In some examples, the storing of the data chunks may be according to the mapped data access operations. If AP(s) 134, EP(s) 136 and VFUs 138 are arranged in configuration like centralized NMP 200, the data chunks may be placed in a centralized local memory 132. If AP(s) 134, EP(s) 136 and VFUs 138 are arranged in configuration like distributed NMP 300, the data chunks may be placed in a distributed local memory 132 that is distributed among VFUs 138 (e.g., each VFU has its own allocation of local memory 132).

Moving to process 4.10 (Access Data Chunk(s)), one or more VFUs 138 may access the data chunks placed in local memory 132 according to the compute instructions provided by EP(s) 136. Those compute instructions may indicate what memory address(es) of local memory 132 are to be accessed to obtain the data chunks.

Moving to process 4.11 (Compute Iteration(s)), one or more VFUs 138 compute one or more iterations using the data chunks obtained from local memory 132. According to some examples, the compute throughput for VFUs 138 may be balanced with the memory access bandwidth of AP(s) 134 to place data chunks in local memory 132 such that when a data chunk is accessed and used for a compute iteration, subsequent data chunks are available in local memory 132 for subsequent compute iterations with little to no waiting by VFUs 138. This memory access bandwidth to compute throughput balance may be based on the exchanged synchronization information as mentioned above for process 4.4.

Moving to process 4.12 (Store Result(s)), VFU(s) 138 may store or place one or more results in local memory 132 following completion of the one or more compute iterations. In some examples, the one or more results may be stored based on the compute instructions received from EP(s) 136. Those instructions may indicate what memory address(es) of local memory 132 to place the one or more results. For these examples, EP(s) 136 may monitor the placement of the result in order to determine a status of its mapped compute operations.

Moving to process 4.13 (Pull Result(s)), logic and/or features of AP(s) 134 may pull or obtain the results placed in local memory 132 by VFU(s) 138. According to some examples, logic and/or features of AP(s) 134 may at least temporarily store the pulled or obtained results in a private cache. Also, the results may be pulled or obtained based, at least in part, on the exchanged synchronization information as mentioned above for process 4.4.

Moving to process 4.14 (Store Result(s)), logic and/or features of AP(s) 134 may cause the one or more results to be stored to system memory 110. In some examples, AP(s) 134 may cause the one or more results to be stored based on the data access instructions included in the instructions received from host application 105.

Moving to process 4.15 (Provide Result(s) Mem. Address(es)), logic and/or features of AP(s) 134 may provide to NMP controller 131 a memory address or memory addresses indicating where the result have been stored to system memory 110. In some examples, a result indication may not be needed. For these examples, host application 105 may monitor memory addresses that may have been indicated in the sent instructions for a purpose to store results in order to determine when results are received.

Moving to process 4.16 (Forward Result(s) Mem. Address(es)), NMP controller 131 may forward the indicated memory address(es) to host application 105. In some examples, host application may access the indicated memory address(es) to obtain the results.

Moving to process 4.17 (Retire Compute Instructions), logic and/or features of EP(s) 136 may send an indication retire the compute instructions. According to some examples, the indication to retire the compute instructions may be based on the mapped compute operations. The mapped compute operations may have indicated how many results were to be placed in local memory 132 before the compute instructions needed to be retired. EP(s) 136 monitoring of the placement of results to LM 132 by VFU(s) 138 as mentioned above for process 4.12. Process 400 then comes to an end.

Figure 5:
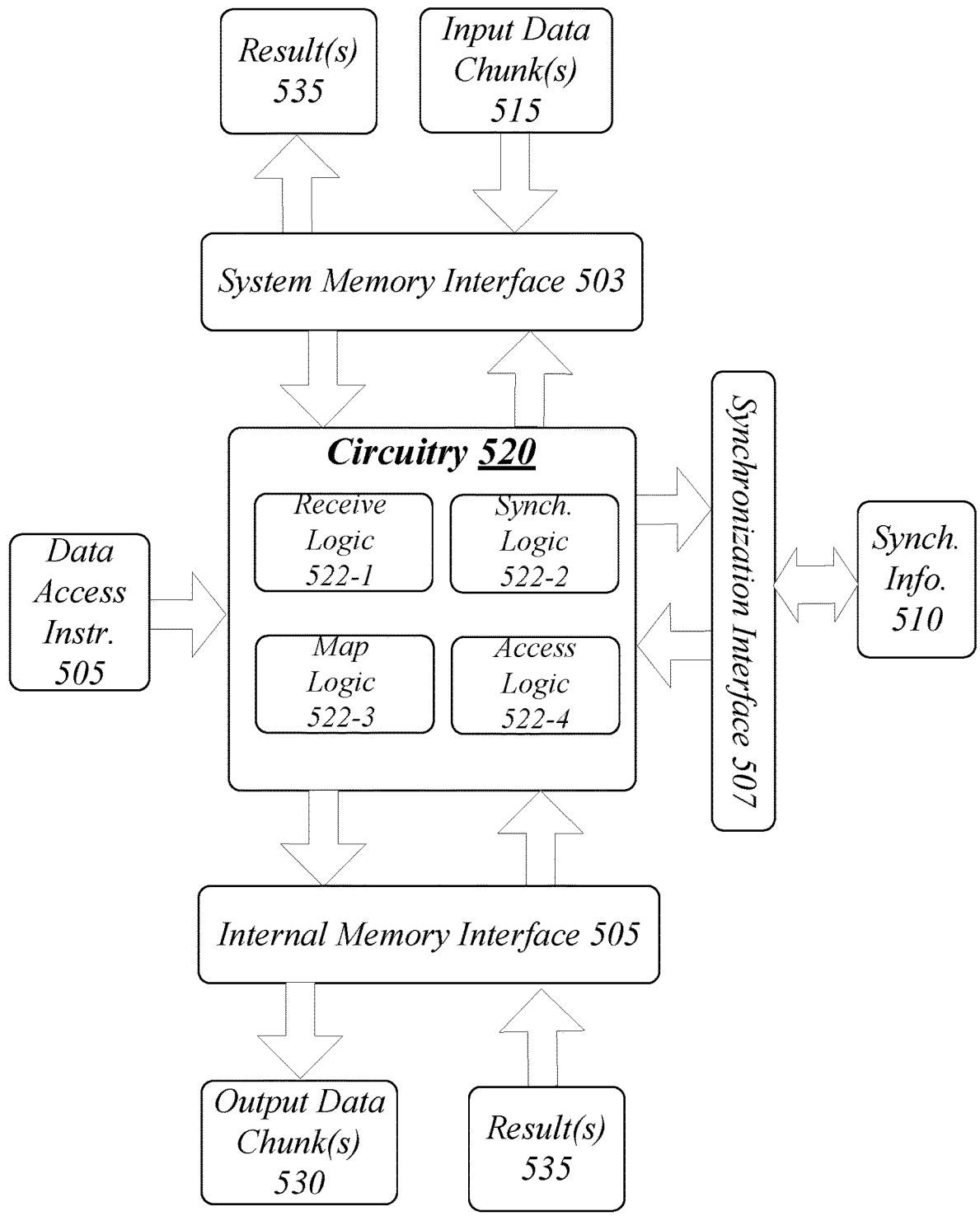
FIG. 5 illustrates an example first apparatus.

FIG. 5 illustrates an example block diagram for apparatus 500. Although apparatus 500 shown in FIG. 5 has a limited number of elements in a certain topology, it may be appreciated that apparatus 500 may include more or less elements in alternate topologies as desired for a given implementation.

According to some examples, apparatus 500 may be supported by circuitry 520 of a near-memory processor such as NMP 130. For these examples, circuitry 520 may be an ASIC, FPGA, configurable logic, processor, processor circuit, or one or more cores of a near-memory processor. Circuitry 520 may be arranged to execute logic or one or more software or firmware implemented modules, components or features of the logic. It is worthy to note that "a" and "b" and "c" and similar designators as used herein are intended to be variables representing any positive integer. Thus, for example, if an implementation sets a value for a=4, then a complete set of software or firmware for modules, components of logic 522-$a$ may include logic 522-1, 522-2, 522-3 or 522-4. The examples presented are not limited in this context and the different variables used throughout may represent the same or different integer values. Also, "module", "component" or "feature" may also include software or firmware stored in computer-readable or machine-readable media, and although types of features are shown in FIG. 5 as discrete boxes, this does not limit these types of features to storage in distinct computer-readable media components (e.g., a separate memory, etc.).

According to some examples, apparatus 500 may include a system memory interface 503 to couple with system memory coupled to the near-memory processor that includes circuitry 520 Apparatus 500 may also include a synchronization interface 507 via which logic and/or features of circuitry 520 may exchange synchronization information 510 with additional circuitry of the near-memory processor that is separate from circuitry 520. Apparatus 500 may also include an internal memory interface 503 to access a local memory at the near-memory processor.

In some examples, apparatus 500 may also include a receive logic 522-1. Receive logic 522-1 may be executed or supported by circuitry 520 to receive data access instructions to access the system memory that have corresponding compute instructions that were received by a second circuitry of the near-memory processor. For these examples, data access instructions 505 may include the received data access instructions. Also, the second circuitry is a separate circuitry from circuitry 520 that may be a specialized circuitry (e.g., an execute processor) to implement the corresponding compute instructions.

According to some examples, apparatus 500 may also include a synchronization logic 522-2. Synchronization logic 522-2 may be executed or supported by circuitry 520 to exchange synchronization information with the second circuitry to store one or more data chunks from the accessed system memory to a local memory at the near-memory processor for the second circuitry to use for one or more compute iterations. For these examples, synchronization information (synch. Info.) 510 may include the exchanged synchronization information. Synch. Info. 510 may be exchanged by synchronization logic 522-2 through synchronization interface 507.

In some examples, apparatus 500 may also include a map logic 522-3. Map logic 522-3 may be executed or supported by circuitry 520 to map data access operations for the first circuitry to access the system memory through system memory interface 503 to obtain the one or more data chunks based on the data access instructions and the exchanged synchronization information. For these examples, input data chunk(s) 515 may include the one or more data chunks accessed through system memory interface 503.

According to some examples, apparatus 500 may also include an access logic 522-4. Access logic 522-4 may be executed or supported by circuitry 520 to access the system memory through system memory interface 503 to obtain the input data chunk(s) 515 via the one or memory channels based on the data access operations mapped by map logic 522-3. Access logic 522-4 may then cause the one or more data chunks included in input data chunk(s) 515 to be stored to the local memory through local memory interface 505 based on the data access operations mapped by map logic 522-3. These one or more data chunks may be included in output data chunk(s) 530. Access logic 522-4 may then obtain results of the one or more compute iterations based on the exchanged synchronization information included in synch. info. 510. The results may be included in result(s) 535 and access logic 522-4, for example, may obtain these results through local memory interface 505. Access logic 522-4 may then cause result(s) 535 to be stored in the system memory based on the data access instructions.

Various components of apparatus 500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example logic flow 600. Logic flow 600 may be representative of some or all of the operations executed by one or more logic, features, or devices described herein, such as apparatus 500. More particularly, logic flow 600 may be implemented by receive logic 522-1, synchronization logic 522-2, map logic 522-3 or access logic 522-4.

According to some examples, logic flow 600 at block 602 may receive, at first circuitry of a near-memory processor, data access instructions to access a system memory, the data access instructions having corresponding compute instructions received by a second circuitry of the near-memory processor. For these examples, receive logic 522-1 may receive the data access instructions. Also, the first circuitry may be circuitry 520 and the second circuitry may be specialized circuitry to implement the corresponding compute instructions.

In some examples, logic flow 600 at block 604 may exchange synchronization information with the second circuitry to store one or more data chunks from the accessed system memory to a local memory at the near-memory processor for the second circuitry to use for one or more compute iterations. For these examples, synchronization logic 522-2 may exchange the synchronization information.

According to some examples, logic flow 600 at block 606 may map data access operations for the first circuitry to access the system memory to obtain the one or more data chunks based on the data access instructions and the exchanged synchronization information. For these examples, map logic 522-3 may map the data access operations.

In some examples, logic flow 600 at block 608 may access the system memory to obtain the one or more data chunks via one or memory channels coupled with the near-memory processor based on the mapped data access operations and store the one or more data chunks to the local memory based on the mapped data access operations. For these examples, access logic 522-4 may access the system memory to obtain the one or more data chunks.

According some examples, logic flow 600 at block 610 may store the one or more data chunks to the local memory based on the mapped data access operations. For these examples, access logic 522-4 may also store the one or more data chunks to the local memory.

FIG. 7 illustrates an example storage medium 700. In some examples, storage medium 700 may be an article of manufacture. Storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
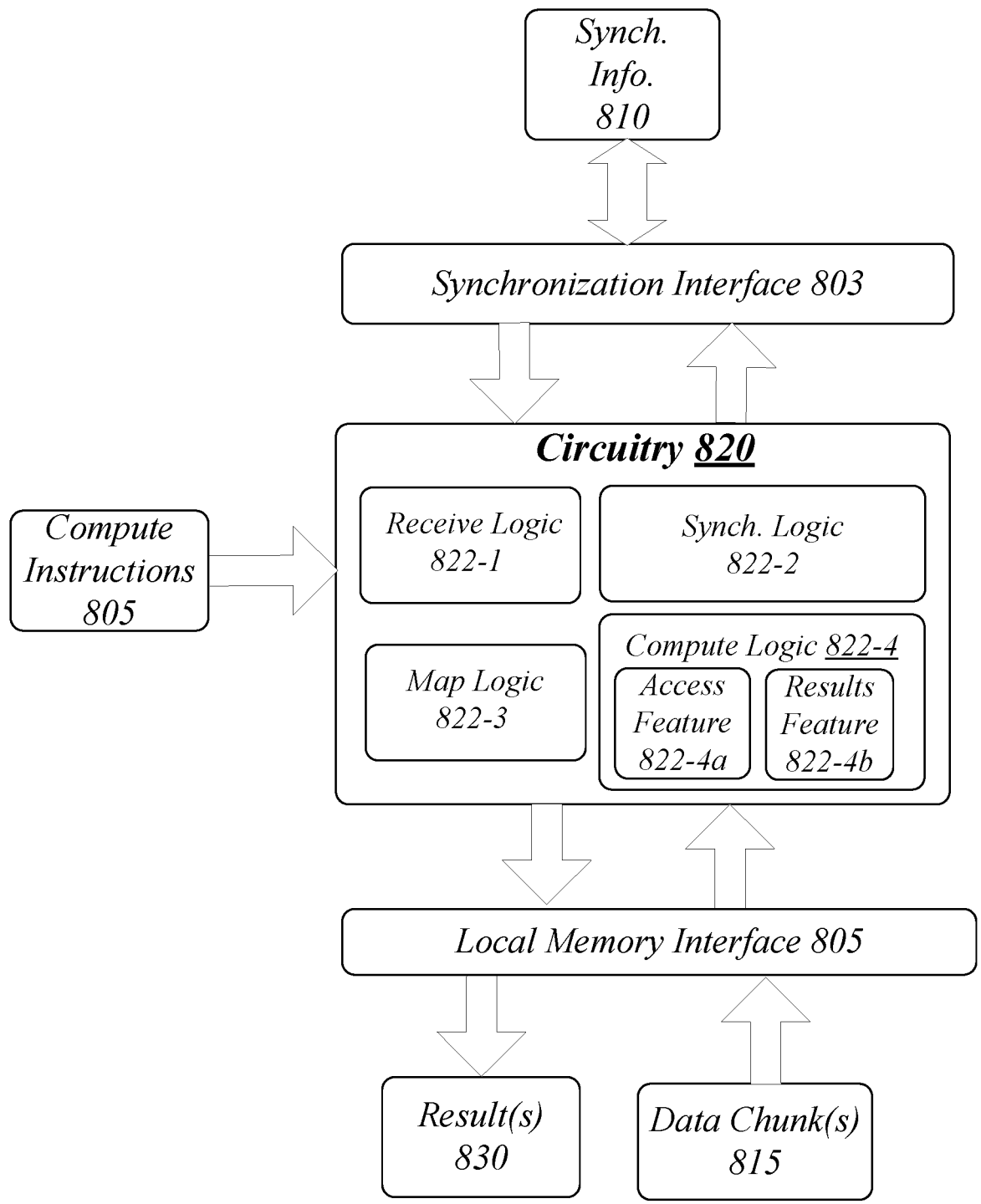
FIG. 8 illustrates an example second apparatus.

FIG. 8 illustrates an example block diagram for apparatus 800. Although apparatus 800 shown in FIG. 8 has a limited number of elements in a certain topology, it may be appreciated that the apparatus 800 may include more or less elements in alternate topologies as desired for a given implementation.

According to some examples, apparatus 800 may be supported by circuitry 820 of a near-memory processor such as NMP 130. For these examples, circuitry 820 may be an ASIC, FPGA, configurable logic, processor, processor circuit, or one or more cores of a near-memory processor. Circuitry 820 may be arranged to execute logic one or more software or firmware implemented modules, components or features of the logic. It is worthy to note that "a" and "b" and "c" and similar designators as used herein are intended to be variables representing any positive integer. Thus, for example, if an implementation sets a value for a=4 then a complete set of software or firmware for modules, components of logic 822-a may include logic 822-1, 822-2, 822-3 or 822-4. The examples presented are not limited in this context and the different variables used throughout may represent the same or different integer values. Also, "module", "component" or "feature" may also include software/firmware stored in computer-readable media, and although types of features are shown in FIG. 8 as discrete boxes, this does not limit these types of features to storage in distinct computer-readable media components (e.g., a separate memory, etc.).

According to some examples, apparatus 800 may include a synchronization interface 803 via which logic and/or features of circuitry 820 may exchange synchronization information 510 with additional circuitry of the near-memory processor that is separate from circuitry 520. Apparatus 800 may also include a local memory interface 805 to access a local memory at the near-memory processor.

In some examples, apparatus 800 may also include a receive logic 822-1. Receive logic 822-1 may be executed or supported by circuitry 820 to receive compute instructions use one or more data chunks accessed from a system memory in one or more compute iterations, the one or more data chunks accessed and stored to the local memory by a second circuitry of the near-memory processor based on corresponding data access instructions. For these examples, compute instructions 805 may include the received compute instructions. Also, the second circuitry is a separate circuitry from circuitry 820 that may be a specialized circuitry (e.g., an access processor) to implement the corresponding data access instructions.

According to some examples, apparatus 800 may also include a synchronization logic 822-2. Synchronization logic 822-2 may be executed or supported by circuitry 820 to exchange synchronization information with the second circuitry to access the one or more data chunks stored to the local memory for use in the one or more compute iterations. For these examples, synch. info. 810 may be exchanged through synchronization interface 803 and includes the exchanged synchronization information.

In some examples, apparatus 800 may also include a map logic 822-3. Map logic 822-3 may be executed or supported by circuitry 820 to map compute operations for the first circuitry to use the one or more data chunks based on the received compute instructions included in compute instructions 805 and the exchanged synchronization information included in synch. info. 810.

According to some examples, apparatus 800 may also include a compute logic 822-4 to access the local memory through local memory interface 805 to obtain the one or more data chunks based on the mapped compute operations and then store results of the one or more compute iterations to the local memory through local memory interface 805 interface based on the exchanged synchronization information. For these examples, an access feature 822-4a of compute logic 822-4 may access the local memory through local memory interface 805 to obtain the one or more data chunks. A results feature 822-4b of compute logic 822-4 may generate results for the one or more compute iterations based on the compute operations mapped by map logic 822-3 and then store the results to the local memory through local memory interface 805 based on the exchanged synchronization information included in synch. info. 810. In some examples, compute logic 822-4 may be one or more vector functional units having results feature 822-4b or access feature 822-4a.

Various components of apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 9 illustrates an example logic flow 900. Logic flow 900 may be representative of some or all of the operations executed by one or more logic, features, or devices described herein, such as apparatus 800. More particularly, logic flow 900 may be implemented by receive logic 822-1, synchronization logic 822-2, map logic 822-3 or compute logic 822-4.

According to some examples, logic flow 900 at block 902 may receive, at a first circuitry of a near-memory processor, compute instructions to use one or more data chunks accessed from a system memory in one or more compute iterations, the one or more data chunks accessed and stored to a local memory at the near-memory processor by a second circuitry of the near-memory processor based on corresponding data access instructions. For these examples, receive logic 822-1 may receive the compute instructions. Also, the first circuitry may be circuitry 820 and the second circuitry may be specialized circuitry to implement the corresponding data access instructions.

In some examples, logic flow 900 at block 904 may exchange synchronization information with the second circuitry to access the one or more data chunks stored to the local memory for use in the one or more compute iterations. For these examples, synchronization logic 822-2 may exchange the synchronization information.

According to some examples, logic flow 900 at block 906 may map compute operations for the first circuitry to use the one or more data chunks based on the received compute instructions and the exchanged synchronization information. For these examples, may logic 822-3 may map the compute operations.

In some examples, logic flow 900 at block 908 may access the local memory to obtain the one or more data chunks based on the mapped compute operations. For these examples, access feature 822-4(a) of compute logic 822-4 may access the local memory to obtain the one or more data chunks.

According to some examples, logic flow 900 at block 910 may store results of the one or more compute iterations to the local memory based on the exchanged synchronization information. For these examples, results feature 822-4b of compute logic 822-4 may cause the results of the one or more compute iterations to be stored to the local memory.

FIG. 10 illustrates an example storage medium 1000. In some examples, storage medium 1000 may be an article of manufacture. Storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
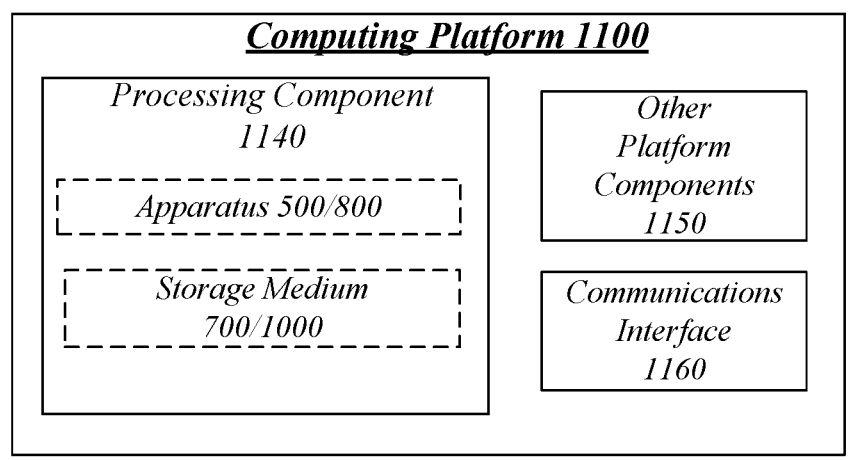
FIG. 11 illustrates an example computing platform.

FIG. 11 illustrates an example computing platform 1100. In some examples, as shown in FIG. 11, computing platform 1100 may include a processing components 1140, other platform components 1150 or a communications interface 1160.

According to some examples, processing components 1140 may execute or implement processing operations or logic for apparatus 500/800 and/or storage medium 700/1000. Processing components 1140 may include various hardware elements, software elements, or a combination of both to implement a near-memory processor. Examples of hardware elements may include devices, logic devices, components, processors, microprocessors, management controllers, companion dice, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, memory units (that include system memory), chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification or the I3C specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2018, Carrier sense Multiple access with Collision Detection (CSMA/CD) Access Method and Physical Layer Specifications, Published in August 2018 (hereinafter "IEEE 802.3 specification"). Network communication may also occur according to one or more OpenFlow specifications such as the OpenFlow Hardware Abstraction API Specification. Network communications may also occur according to one or more Infiniband Architecture specifications.

Computing platform 1100 may be implemented in a server or client computing device. Accordingly, functions and/or specific configurations of computing platform 1100 described herein, may be included or omitted in various embodiments of computing platform 1100, as suitably desired for a server or client computing device.

The components and features of computing platform 1100 may be implemented using any combination of discrete circuitry, ASICs, logic gates and/or single chip architectures. Further, the features of computing platform 1100 may be implemented using microcontrollers, FPGAs and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" and may be similar to IP blocks. IP cores may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The follow examples pertain to additional examples of technologies disclosed herein.

Example 1. An example apparatus may include a first circuitry of a near-memory processor. The first circuitry may receive data access instructions to access a system memory. The data access instructions may have corresponding compute instructions that were received by a second circuitry of the near-memory processor. The first circuitry may also exchange synchronization information with the second circuitry to store one or more data chunks from the accessed system memory to a local memory at the near-memory processor for the second circuitry to use for one or more compute iterations. The first circuitry may also map data access operations for the first circuitry to access the system memory to obtain the one or more data chunks based on the data access instructions and the exchanged synchronization information.

Example 2. The apparatus of example 1, the first circuitry may map the data access operations such that a memory access bandwidth to obtain and store the one or more data chunks to the local memory substantially matches a computing throughput for the second circuitry to compute results in the one or more compute iterations using the one or more data chunks stored to the local memory.

Example 3. The apparatus of example 2, the exchanged synchronization information may include a barrier synchronization primitive to indicate to the first circuitry a number of subsequent data chunks to access from the system memory while the second circuitry computes results using at least a portion of the one or more data chunks. The number of subsequent data chunks may be determined based on substantially matching the memory access bandwidth to the computing throughput.

Example 4. The apparatus of example 1, the circuitry may also access the system memory through an interface coupled with the near-memory processor via one or more memory channels to obtain the one or more data chunks via the one or memory channels based on the mapped data access operations. The first circuitry may also store the one or more data chunks to the local memory based on the mapped data access operations.

Example 5. The apparatus of example 4, the first circuitry may also obtain results of the one or more compute iterations based on the exchanged synchronization information. The first circuitry may also cause the results to be stored in the system memory based on the data access instructions.

Example 6. The apparatus of example 1, the data access instructions may be included in instructions received from an application hosted by a computing platform that also hosts the near-memory processor.

Example 7. The apparatus of example 1, the first circuitry to include one or more access processors and the second circuitry to include one or more execute processors and one or more vector functional units. Respective one or more execute processors to control respective one or more vector functional units for the respective one or more vector functional units to compute the results in the one or more compute iterations.

Example 8. The apparatus of example 7, the one or more vector functional units may include SIMD ALUs.

Example 9. The apparatus of example 7, the local memory may be arranged in a centralized configuration via which the one or more vector functional units separately have access to the local memory.

Example 10. The apparatus of example 7, the local memory may be arranged in a distributed configuration via which the one or more vector functional units have access to allocated portions of the local memory.

Example 11. An example method may include receiving, at first circuitry of a near-memory processor, data access instructions to access a system memory. The data access instructions may have corresponding compute instructions received by a second circuitry of the near-memory processor. The method may also include exchanging synchronization information with the second circuitry to store one or more data chunks from the accessed system memory to a local memory at the near-memory processor for the second circuitry to use for one or more compute iterations. The method may also include mapping data access operations for the first circuitry to access the system memory to obtain the one or more data chunks based on the data access instructions and the exchanged synchronization information.

Example 12. The method of example 11 may also include mapping the data access operations such that a memory access bandwidth to obtain and store the one or more data chunks to the local memory substantially matches a computing throughput for the second circuitry to compute results in the one or more compute iterations using the one or more data chunks stored to the local memory.

Example 13. The method of example 12, the exchanged synchronization information may include a barrier synchronization primitive to indicate to the first circuitry a number of subsequent data chunks to access from the system memory while the second circuitry computes results using at least a portion of the one or more data chunks. The number of subsequent data chunks may be determined based on substantially matching the memory access bandwidth to the computing throughput.

Example 14. The method of example 11 may also include accessing the system memory through an interface coupled with the near-memory processor via one or more memory channels to obtain the one or more data chunks via the one or memory channels based on the mapped data access operations. The method may also include storing the one or more data chunks to the local memory based on the mapped data access operations.

Example 15. The method of example 14 may also include obtaining results of the one or more compute iterations based on the exchanged synchronization information. The method may also include causing the results to be stored in the system memory based on the data access instructions.

Example 16. The method of example 11, the data access instructions may be included in instructions received from an application hosted by a computing platform that also hosts the near-memory processor.

Example 17. The method of example 11 may also include the first circuitry including one or more access processors coupled with system memory through one or more memory channels coupled with the near-memory processor. The method may also include the second circuitry including one or more execute processors and one or more vector functional units, respective one or more execute processors to control respective one or more vector functional units for the respective one or more vector functional units to compute the results in the one or more compute iterations.

Example 18. The method of example 17, the one or more vector functional units may be SIMD ALUs.

Example 19. The method of example 17, the local memory may be arranged in a centralized configuration via which the one or more vector functional units separately have access to the local memory.

Example 20. The method of example 17, the local memory may be arranged in a distributed configuration via which the one or more vector functional units have access to allocated portions of the local memory.

Example 21. An example at least one machine readable medium may include a plurality of instructions that in response to being executed by a system may cause the system to carry out a method according to any one of examples 11 to 20.

Example 22. An example apparatus may include means for performing the methods of any one of examples 11 to 20.

Example 23. An example at least one machine readable medium may include a plurality of instructions that in response to being executed by a first circuitry of a near-memory processor may cause the first circuitry to receive data access instructions to access a system memory. The data access instructions may have corresponding compute instructions received by a second circuitry of the near-memory processor. The instructions may also cause the first circuitry to exchange synchronization information with the second circuitry to store one or more data chunks from the accessed system memory to a local memory at the near-memory processor for the second circuitry to use for one or more compute iterations. The instructions may also cause the first circuitry to map data access operations for the first circuitry to access the system memory to obtain the one or more data chunks based on the data access instructions and the exchanged synchronization information.

Example 24. The at least one machine readable medium of example 23, the instructions may cause the first circuitry to map the data access operations such that a memory access bandwidth to obtain and store the one or more data chunks to the local memory substantially matches a computing throughput for the second circuitry to compute results in the one or more compute iterations using the one or more data chunks stored to the local memory.

Example 25. The at least one machine readable medium of example 24, the exchanged synchronization information may include a barrier synchronization primitive to indicate to the first circuitry a number of subsequent data chunks to access from the system memory while the second circuitry computes results using at least a portion of the one or more data chunks. The number of subsequent data chunks may be determined based on substantially matching the memory access bandwidth to the computing throughput.

Example 26. The at least one machine readable medium of example 23, the instructions may also cause the first circuitry to access the system memory through an interface coupled with the near-memory processor via one or more memory channels to obtain the one or more data chunks via the one or memory channels based on the mapped data access operations. The instructions may also cause the first circuitry to store the one or more data chunks to the local memory based on the mapped data access operations.

Example 27. The at least one machine readable medium of example 26, the instructions may also cause the first circuitry to obtain results of the one or more compute iterations based on the exchanged synchronization information. The instructions may also cause the first circuitry to cause the results to be stored in the system memory based on the data access instructions.

Example 28. The at least one machine readable medium of example 23, the first circuitry may include one or more access processors coupled with system memory through one or more memory channels coupled with the near-memory processor. The second circuitry may include one or more execute processors and one or more vector functional units. Respective one or more execute processors may control respective one or more vector functional units for the respective one or more vector functional units to compute the results in the one or more compute iterations.

Example 29. The at least one machine readable medium of example 28, the one or more vector functional units may be SIMD ALUs.

Example 30. The at least one machine readable medium of example 28, the local memory may be arranged in a centralized configuration via which the one or more vector functional units separately have access to the local memory.

Example 31. The at least one machine readable medium of example 28, the local memory may be arranged in a distributed configuration via which the one or more vector functional units have access to allocated portions of the local memory.

Example 32. An example apparatus may include a first circuitry of a near-memory processor to receive compute instructions to use one or more data chunks accessed from a system memory in one or more compute iterations. The one or more data chunks may be accessed and stored to a local memory by a second circuitry of the near-memory processor based on corresponding data access instructions. The first circuitry may also exchange synchronization information with the second circuitry to access the one or more data chunks stored to the local memory for use in the one or more compute iterations. The first circuitry may also map compute operations for the first circuitry to use the one or more data chunks based on the received compute instructions and the exchanged synchronization information.

Example 33. The apparatus of example 32, the first circuitry may map the compute operations such that a computing throughput for the first circuitry to compute results in the one or more compute iterations substantially matches a memory access bandwidth for the second circuitry to store the one or more data chunks to the local memory.

Example 34. The apparatus of example 33, the exchanged synchronization information may include a barrier synchronization primitive to indicate to the second circuitry a number of subsequent data chunks to access from the system memory while the first circuitry computes results using at least a portion of the one or more data chunks. The number of subsequent data chunks may be determined based on substantially matching the memory access bandwidth to the computing throughput.

Example 35. The apparatus of example 32 may also include the first circuitry to access the local memory through an interface to the local memory to obtain the one or more data chunks based on the mapped compute operations. The first circuitry may also store results of the one or more compute iterations to the local memory through the interface based on the exchanged synchronization information.

Example 36. The apparatus of example 32, the compute instructions may be included in instructions received from an application hosted by a computing platform that also hosts the near-memory processor.

Example 37. The apparatus of example 32, the first circuitry may include one or more execute processors and one or more vector functional units. Respective one or more execute processors to control respective one or more vector functional units for the respective one or more vector functional units to compute the results in the one or more compute iterations. The second circuitry may include one or more access processors coupled with system memory through one or more memory channels coupled with the near-memory processor.

Example 38. The apparatus of example 37, the one or more vector functional units may be SIMD ALUs.

Example 39. The apparatus of example 37, the local memory may be arranged in a centralized configuration via which the one or more vector functional units separately have access to the local memory.

Example 40. The apparatus of example 37, the local memory may be arranged in a distributed configuration via which the one or more vector functional units have access to allocated portions of the local memory.

Example 41. An example method may include receiving, at a first circuitry of a near-memory processor, compute instructions to use one or more data chunks accessed from a system memory in one or more compute iterations. The one or more data chunks may be accessed and stored to a local memory at the near-memory processor by a second circuitry of the near-memory processor based on corresponding data access instructions. The method may also include exchanging synchronization information with the second circuitry to access the one or more data chunks stored to the local memory for use in the one or more compute iterations. The method may also include mapping compute operations for the first circuitry to use the one or more data chunks based on the received compute instructions and the exchanged synchronization information.

Example 42. The method of example 41 may also include mapping the compute operations such that a computing throughput for the first circuitry to compute results in the one or more compute iterations substantially matches a memory access bandwidth for the second circuitry to store the one or more data chunks to the local memory.

Example 43. The method of example 42, the exchanged synchronization information may include a barrier synchronization primitive to indicate to the second circuitry a number of subsequent data chunks to access from the system memory while the first circuitry computes results using at least a portion of the one or more data chunks. The number of subsequent data chunks may be determined based on substantially matching the memory access bandwidth to the computing throughput.

Example 44. The method of example 41 may also include accessing the local memory to obtain the one or more data chunks based on the mapped compute operations. The method may also include storing results of the one or more compute iterations to the local memory based on the exchanged synchronization information.

Example 45. The method of example 41, the compute instructions may be included in instructions received from an application hosted by a computing platform that also hosts the near-memory processor.

Example 46. The method of example 41, the first circuitry may include one or more execute processors and one or more vector functional units, respective one or more execute processors to control respective one or more vector functional units for the respective one or more vector functional units to compute the results in the one or more compute iterations. The second circuitry may include one or more access processors coupled with system memory through one or more memory channels coupled with the near-memory processor.

Example 47. The method of example 46, the one or more vector functional units may be SIMD ALUs.

Example 48. The method of example 46, the local memory may be arranged in a centralized configuration via which the one or more vector functional units separately have access to the local memory.

Example 49. The method of example 46, the local memory may be arranged in a distributed configuration via which the one or more vector functional units have access to allocated portions of the local memory.

Example 50. An example at least one machine readable medium may include a plurality of instructions that in response to being executed by a system may cause the system to carry out a method according to any one of examples 41 to 49.

Example 51. An example apparatus may include means for performing of any one of examples 41 to 49.

Example 52. An example at least one machine readable medium may include a plurality of instructions that in response to being executed by a first circuitry of a near-memory processor may cause the first circuitry to receive compute instructions to use one or more data chunks accessed from a system memory in one or more compute iterations. The one or more data chunks may be accessed and stored to a local memory at the near-memory processor by a second circuitry of the near-memory processor based on corresponding data access instructions. The instructions may also cause the first circuitry to exchange synchronization information with the second circuitry to access the one or more data chunks stored to the local memory for use in the one or more compute iterations. The instructions may also cause the first circuitry to map compute operations for the first circuitry to use the one or more data chunks based on the received compute instructions and the exchanged synchronization information.

Example 53. The at least one machine readable medium of example 52, the instructions may also cause the first circuitry to map the compute operations such that a computing throughput for the first circuitry to compute results in the one or more compute iterations substantially matches a memory access bandwidth for the second circuitry to store the one or more data chunks to the local memory.

Example 54. The at least one machine readable medium of example 42, the exchanged synchronization information may include a barrier synchronization primitive to indicate to the second circuitry a number of subsequent data chunks to access from the system memory while the first circuitry computes results using at least a portion of the one or more data chunks, the number of subsequent data chunks determined based on substantially matching the memory access bandwidth to the computing throughput.

Example 55. The at least one machine readable medium of example 52, the instructions may further cause the first circuitry access the local memory to obtain the one or more data chunks based on the mapped compute operations. The instructions may also cause the first circuitry to store results of the one or more compute iterations to the local memory based on the exchanged synchronization information.

Example 56. The at least one machine readable medium of example 52, the compute instructions may be included in instructions received from an application hosted by a computing platform that also hosts the near-memory processor.

Example 57. The at least one machine readable medium of example 52, the first circuitry may include one or more execute processors and one or more vector functional units, respective one or more execute processors to control respective one or more vector functional units for the respective one or more vector functional units to compute the results in the one or more compute iterations. The second circuitry may include one or more access processors coupled with system memory through one or more memory channels coupled with the near-memory processor.

Example 58. The at least one machine readable medium of example 57, the one or more vector functional units may be SIMD ALUs.

Example 59. The at least one machine readable medium of example 57, the local memory may be arranged in a centralized configuration via which the one or more vector functional units separately have access to the local memory.

Example 60. The at least one machine readable medium of example 57, the local memory may be arranged in a distributed configuration via which the one or more vector functional units have access to allocated portions of the local memory.

Example 61. An example near-memory processor may include an interface to access system memory coupled with the near-memory processor via one or more memory channels. The near memory processor may also include a local memory, a first circuitry and a second circuitry. The second circuitry may receive data access instructions to access the system memory that have corresponding compute instructions that were received by the first circuitry. The second circuitry may also exchange synchronization information with the first circuitry to store one or more data chunks from the accessed system memory to the local memory for the first circuitry to use for one or more compute iterations. The second circuitry may also map data access operations for the second circuitry to access the system memory through the interface to obtain the one or more data chunks based on the data access instructions and the exchanged synchronization information.

Example 62. The near-memory processor of example 61, the second circuitry may map the data access operations such that a memory access bandwidth to obtain and store the one or more data chunks to the local memory substantially matches a computing throughput for the first circuitry to compute results in the one or more compute iterations using the one or more data chunks stored to the local memory.

Example 63. The near-memory processor of example 61, the second circuitry may include one or more access processors. The first circuitry may include one or more execute processors and one or more vector functional units. Respective one or more execute processors to control respective one or more vector functional units for the respective one or more vector functional units to compute the results in the one or more compute iterations.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data processing apparatus comprising:
   an interface configured to couple to one or more memory channels of a system memory;
   a local memory;
   execute circuitry; and
   access circuitry to:
     receive data access instructions to access the system memory that have corresponding execute instructions that were received by the execute circuitry;
     exchange synchronization information with the execute circuitry to store one or more data chunks obtained from the system memory to the local memory for the execute circuitry to use for one or more compute iterations; and
     cause data access operations to access the system memory through the interface to obtain the one or more data chunks based on the received data access instructions and the exchanged synchronization information, wherein memory access bandwidth to obtain and store the one or more data chunks to the local memory during the data access operations substantially matches a computing throughput for the execute circuitry to compute results in the one or more compute iterations using the one or more data chunks stored to the local memory.

2. The data processing apparatus of claim 1, the exchanged synchronization information comprises a barrier synchronization primitive to indicate to the access circuitry a number of subsequent data chunks to obtain from the system memory while the execute circuitry computes results using at least a portion of the one or more data chunks, the number of subsequent data chunks determined based on substantially matching the memory access bandwidth to the computing throughput.

3. The data processing apparatus of claim 1, further comprising the access circuitry to:
   obtain results of the one or more compute iterations based on the exchanged synchronization information; and
   cause the results to be stored in the system memory based on the received data access instructions.

4. The data processing apparatus of claim 1, comprising the received data access instructions included in instructions received from an application hosted by a computing platform that also hosts the data processing apparatus.

5. The data processing apparatus of claim 1, comprising:
   the access circuitry to include one or more access processors; and
   the execute circuitry to include one or more execute processors and one or more vector functional units, respective one or more execute processors to control respective one or more vector functional units for the respective one or more vector functional units to compute the results in the one or more compute iterations.

6. The data processing apparatus of claim 5, comprising the local memory arranged in a centralized configuration via which the one or more execute processors or vector functional units separately have access to the local memory.

7. The data processing apparatus of claim 5, comprising the local memory arranged in a distributed configuration via which the one or more execute processors or vector functional units have access to allocated portions of the local memory.

8. The data processing apparatus of claim 5, the one or more vector functional units comprise one or more single instruction, multiple data (SIMD) arithmetic logic units (ALUs).

9. At least one non-transitory machine readable medium comprising a plurality of instructions that in response to being executed by access circuitry of a data processing device, cause the access circuitry to:
   receive data access instructions to access a system memory that have corresponding execute instructions that were received by execute circuitry of the data processing device;
   exchange synchronization information with the execute circuitry to store one or more data chunks obtained from the accessed system memory to a local memory at the data processing device for the execute circuitry to use for one or more compute iterations; and
   cause data access operations to access the system memory to obtain the one or more data chunks based on the received data access instructions and the exchanged synchronization information, wherein memory access bandwidth to obtain and store the one or more data chunks to the local memory during the data access operations substantially matches a computing throughput for the execute circuitry to compute results in the one or more compute iterations using the one or more data chunks stored to the local memory.

10. The at least one non-transitory machine readable medium of claim 9, the exchanged synchronization information comprises a barrier synchronization primitive to indicate to the access circuitry a number of subsequent data chunks to obtain from the system memory while the execute circuitry computes results using at least a portion of the one or more data chunks, the number of subsequent data chunks determined based on substantially matching the memory access bandwidth to the computing throughput.

11. The at least one non-transitory machine readable medium of claim 9, comprising the instructions to further cause the access circuitry to:
obtain results of the one or more compute iterations based on the exchanged synchronization information; and
cause the results to be stored in the system memory based on the received data access instructions.

12. The at least one non-transitory machine readable medium of claim 9, comprising the received data access instructions included in instructions received from an application hosted by a computing platform that also hosts the data processing apparatus.

13. The at least one non-transitory machine readable medium of claim 9, wherein the access circuitry is to include one or more access processors and the execute circuitry is to include one or more execute processors and one or more vector functional units, respective one or more execute processors to control respective one or more vector functional units for the respective one or more vector functional units to compute the results in the one or more compute iterations.

14. The at least one non-transitory machine readable medium of claim 13, comprising the local memory arranged in a centralized configuration via which the one or more execute processors or vector functional units separately have access to the local memory.

15. The at least one non-transitory machine readable medium of claim 13, comprising the local memory arranged in a distributed configuration via which the one or more execute processors or vector functional units have access to allocated portions of the local memory.

16. The at least one non-transitory machine readable medium of claim 13, the one or more vector functional units comprise single instruction, multiple data (SIMD) arithmetic logic units (ALUs).

17. A method implemented at access circuitry of a data processing device comprising:
receiving data access instructions to access a system memory that have corresponding execute instructions that were received by execute circuitry of the data processing device;
exchanging synchronization information with the execute circuitry to store one or more data chunks obtained from the accessed system memory to a local memory at the data processing device for the execute circuitry to use for one or more compute iterations; and
causing data access operations to access the system memory to obtain the one or more data chunks based on the received data access instructions and the exchanged synchronization information, wherein memory access bandwidth for obtaining and storing the one or more data chunks to the local memory during the data access operations substantially matches a computing throughput for the execute circuitry to compute results in the one or more compute iterations using the one or more data chunks stored to the local memory.

18. The method of claim 17, the exchanged synchronization information comprises a barrier synchronization primitive to indicate to the access circuitry a number of subsequent data chunks to obtain from the system memory while the execute circuitry computes results using at least a portion of the one or more data chunks, the number of subsequent data chunks determined based on substantially matching the memory access bandwidth to the computing throughput.

19. The method of claim 17, further comprising:
obtaining results of the one or more compute iterations based on the exchanged synchronization information; and
causing the results to be stored in the system memory based on the received data access instructions.

20. The method of claim 17, comprising the received data access instructions included in instructions received from an application hosted by a computing platform that also hosts the data processing apparatus.

* * * * *